(12) United States Patent
Kirschner (10) Patent No.: US 11,460,302 B2
(45) Date of Patent: Oct. 4, 2022

(54) TERRESTRIAL OBSERVATION DEVICE HAVING LOCATION DETERMINATION FUNCTIONALITY

(71) Applicant: Safran Vectronix AG, Heerbrugg (CH)

(72) Inventor: Holger Kirschner, Widnau (CH)

(73) Assignee: SAFRAN VECTRONIX AG, Heerbrugg (CH)

(\*) Notice: Subject to any disclaimer, the term of this patent is extended or adjusted under 35 U.S.C. 154(b) by 588 days.

(21) Appl. No.: 16/436,519

(22) Filed: Jun. 10, 2019

(65) Prior Publication Data

US 2019/0383616 A1 Dec. 19, 2019

(30) Foreign Application Priority Data

Jun. 19, 2018 (EP) .................... 18178464

(51) Int. Cl.
| | |
|---|---|
| *G01C 21/06* | (2006.01) |
| *G01C 9/08* | (2006.01) |
| *G01C 19/02* | (2006.01) |
| *G01C 21/08* | (2006.01) |
| *G02B 23/18* | (2006.01) |

(52) U.S. Cl.
CPC .............. *G01C 21/06* (2013.01); *G01C 9/08* (2013.01); *G01C 19/02* (2013.01); *G01C 21/08* (2013.01); *G02B 23/18* (2013.01)

(58) Field of Classification Search
None
See application file for complete search history.

(56) References Cited

U.S. PATENT DOCUMENTS

| | | | |
|---|---|---|---|
| 5,086,396 A * | 2/1992 | Waruszewski, Jr. | F41G 7/343 701/458 |
| 6,181,302 B1 | 1/2001 | Lynde | |
| 7,451,059 B2 | 11/2008 | Malchi et al. | |
| 9,383,207 B2 | 7/2016 | Padowicz | |

(Continued)

FOREIGN PATENT DOCUMENTS

| | | |
|---|---|---|
| DE | 102016101455 A1 | 7/2017 |
| EP | 1599771 B1 | 9/2008 |
| EP | 2916106 B1 | 6/2018 |

(Continued)

OTHER PUBLICATIONS

"European Search Report," dated Dec. 5, 2018, by the European Patent Office in European Patent Application No. EP 18 17 8464, 2 pages.

(Continued)

*Primary Examiner* — Hunter B Lonsberry
*Assistant Examiner* — Paysun Wu
(74) *Attorney, Agent, or Firm* — Alpine IP PLLC (57) ABSTRACT

The invention relates to an observation device having a location determination functionality for the high-accuracy determination of the spatial location and thus the position and orientation (for example, Euler angles: azimuth, elevation angle, and roll angle) of the observation device by analysis of a recorded camera image of the terrain surrounding the camera by means of the three-dimensional map information of a digital terrain model (DTM). For this purpose, the observation device comprises a camera having an objective lens and a camera sensor, a data memory, a sensor system, an analysis unit, and a display screen.

20 Claims, 7 Drawing Sheets

(56) References Cited

U.S. PATENT DOCUMENTS

2017/0030110 A1     2/2017   Sahjian
2017/0301104 A1    10/2017   Qian et al.

FOREIGN PATENT DOCUMENTS

WO       2011058507 A1    5/2011
WO       2015160287 A1   10/2015

OTHER PUBLICATIONS

"Numerical Recipes in C. The Art of Scientific Computing", Second Edition. William H. Press et al., Cambridge University Press, 1992.
"Camera geolocation from mountain images", by Yi Chen et al., Proceedings of the 18th International Conference on Information Fusion, IEEE, 2013.

* cited by examiner

TERRESTRIAL OBSERVATION DEVICE HAVING LOCATION DETERMINATION FUNCTIONALITY

CROSS-REFERENCE TO RELATED APPLICATIONS

This application claims priority to European patent application 18178464.6 filed Jun. 19, 2018 entitled TERRESTRIAL OBSERVATION DEVICE HAVING LOCATION DETERMINATION FUNCTIONALITY, the contents of which are hereby incorporated by reference herein for all purposes.

FIELD OF THE INVENTION

The invention relates to an observation device having a location determination functionality for high-accuracy determination of the spatial location and thus the position and orientation (for example, Euler angles: azimuth, elevation angle, and roll angle) of the observation device by analyzing a recorded camera image of the terrain surrounding the camera by means of the three-dimensional map information of a digital terrain model (DTM).

BACKGROUND

Fully automatic determination of the spatial location of an observation device offers advantages in the orientation on the earth's surface, for example, when traveling in uninhabited terrain, in the control of autonomous vehicles (unmanned ground vehicle, UGV) referenced with the observation device or unmanned flying objects (unmanned aerial vehicle, UAV) at low altitude.

Problems known from the prior art in the determination of the spatial location of an observation device or a camera by means of automatic analysis of terrestrial images of the earth's surface, for example, concealments of the terrain by trees/buildings/vehicles, weather-dependent color and texture of the terrain areas, confusion of clouds with terrain structures, etc. can result in strongly error-prone and inefficient location determination or even make it impossible.

Such a location determination of an observation device or a camera, which is based on a determination of an orientation and/or position (map-referenced orientation and position) is used, for example, in the automated navigation of vehicles. Another area of application is the location determination of remote targets by geodetic methods, such as polar point recording and triangulation.

Existing location determinations of observation devices or cameras are to be improved in such a way that they are to be able to be executed with higher angle measuring accuracy (for example, better than 1 mil) and with low time expenditure, in the range of a few seconds. Moreover, the corresponding location determination is to be able to be assigned to a defined point in time, whereby a synchronization in the range of milliseconds is enabled.

Different methods and means for location determination known from the prior art are presented hereafter.

i.) Inclination Measurement:

To determine elevation and roll angle, a measurement of the direction of the field of gravity (inclination measurement) is often used, for example, by means of acceleration sensors.

ii.) Digital Magnetic Compass (DMC):

The digital magnetic compass represents a combination of an inclination measurement with a measurement of the direction of the earth's magnetic field. In addition to the possibilities for inclination measurement (see above), a measurement of the azimuth is thus achieved, i.e., the complete orientation (three Euler angles) is measured. In this case, the direction is necessarily defined in relation to the magnetic north direction.

iii.) Gyrocompass

The north direction can be defined by a gyrocompass (gyro), by using the rotation of the earth as a reference for geographic north. For this purpose, the gyrocompass is rigidly connected to the earth's surface and then supplies the north direction after a few minutes. The measurement of the rotational velocity vector of the earth is only possible in rigid connection to the earth's surface.

iv.) Inertial Measurement Unit—IMU

The relative orientation can also be measured using an inertial measurement unit (IMU) within an inertial navigation system (INS). To obtain an absolute, map-referenced orientation therefrom, at least the initialization using a method for measurement of the map-referenced orientation is necessary. The location determination of the observation device described here is ideally suitable for this purpose, since a high-accuracy measured value is achievable at a very accurately defined point in time even in a compact construction and the INS is newly referenced by continuous measurements of the absolute orientation and thus the error accumulation (drift) is reduced.

v.) Global Positioning System (GPS) Tracking

The azimuth can be determined by multiple GPS measurements remote from one another by targeting back from the known site position (GPS measurement) to a previously measured earlier site. This presumes a movement during the measurement.

vi.) Location Determination by Means of Reference Points

If the site position is known (for example, GPS measurement), the complete map-referenced orientation of the device can be determined from direction measurements (in each case azimuth and elevation in relation to an arbitrarily selectable local coordinate system) in relation to at least two reference points, the position (coordinates) of which are known in the map coordinate system (map coordinate system: azimuth with respect to geographical north, elevation and roll angle with respect to earth's field of gravity). Such direction measurements in relation to a local coordinate system can be carried out by targeting the reference points using a defined axis of the device (for example, target axis of a theodolite) or more simply by imaging the reference points by way of a camera and position analysis in the camera image (local coordinate system=camera coordinate system).

The determination of the orientation via the two reference points presumes that the two points do not lie on a straight line with the location. Such reference points have to be easily recognizable, existing, and visible from the location for the method.

vii.) Astronomical Navigation and Location Determination

Location determination methods using direction measurements on heavenly bodies are also known from the prior art. The position of the heavenly objects in relation to the earth is computable at a precisely known (UTC) point in time and date. If the site position of the observer is specified, the map-referenced direction in relation to the heavenly bodies can be computed and these can be used as (very remote) reference points.

viii.) Location Determination Using a DTM

A digital terrain model (DTM) is a digital version of a topographic map, which contains the height profile of the terrain surface in the form of three-dimensional map information. The term DTM is also used here collectively for a so-called digital surface model DSM, which also contains height information of buildings and/or vegetation (forest). Finally, there is also the option of representing the three-dimensional terrain structure as a triangulated irregular network (TIN) or with the aid of similar formats based on the geo-information system (GIS). These variants of the terrain representation are also to be dealt with here with the common term DTM.

The DTM information can be used for location determination in the terrain. Corresponding documents from the patent literature, in which the use of a DTM for location determination is disclosed, are summarized hereafter.

WO2011058507 describes a system and a method for determining the site position and also computes the orientation and thus the spatial location in one variant. Polar point recordings of prominent points of the terrain (for example, mountain peaks) are made from the unknown site. The measured height difference of the points and the measured distance of the points are used to assign these reference points on the map (DTM).

DE 102016101455 describes a device for position determination by means of camera image analysis and comparison to DTM supported on the presence of unambiguously assignable objects.

A system and a method are described in U.S. Pat. No. 7,451,059 B2 for improved determination of an azimuth orientation determined roughly by means of passive target data acquisition system (PTAS) utilizing a terrain model. The system and method are based on the presence of previously known reference target points or on a manual assignment of targeted positions to a position on the DTM.

EP 1599771 describes, inter alia, a passive method (without LRF) for azimuth improvement, i.e., an azimuth which is initially strongly error-prone is corrected using the DTM. This is performed on the basis of a target point selected by the user (specific sighted target).

The system computes an estimation for the position of the target point on the DTM from the initially provided azimuth combined with elevation and site position. The position is displayed to the user and corrected by manual input. The corrected azimuth is computed therefrom.

In a similar manner, U.S. Pat. No. 6,181,302 also achieves a correction of the two other Euler angles (inclination and roll angle) by manual correction of the user.

Furthermore, the prior art comprises methods for navigation of landing modules in space travel, which are based on the spatial location determination of the landing module. For example, in EP2916106, camera images of the planet surface to be landed on and a DTM are used for location determination. Individual terrain features of the DTM (for example, moon craters) are assigned to positions in the image. The spatial location of the camera and thus of the landing module is determined from the point correspondences thus obtained. The recording image contrasts are determined by the interaction of the lighting, which is influenced by the position of the sun, with the planet surface (DTM model thereof), wherein these interactions are taken into consideration in the method.

For example, in WO 2015160287, the horizon line is determined in the camera image and improved values for elevation and roll angle are ascertained based thereon.

U.S. Pat. No. 9,383,207 also works with the analysis of the horizon line (maximum elevation angles, physical skyline, visible horizon). In this method, the azimuth angle is also determined in addition to the user position.

The publication "Camera geolocation from mountain images", by Yi Chen et al., Proceedings of the 18th International Conference on Information Fusion, IEEE, 2013, describes a method for determining the camera location by the comparison of terrain transitions (ridge, skyline) simulated from the DTM to the two-dimensional curves, which are extracted from the camera image. Before a comparison to the simulated DTM depiction is possible, the image analysis has to extract the curves from the camera image for this purpose in a "tracing algorithm".

US2017/0301104A1 describes a similar method for urban surroundings. The image analysis is again performed using a "tracing algorithm", because the comparison of the image to the DTM is based on the comparison of previously extracted two-dimensional curves.

The present invention describes an observation device having a location determination functionality for high-accuracy determination of the spatial location, i.e., the position and orientation, of the observation device using a camera having objective lens, a digital terrain model (DTM), and a corresponding sensor system in conjunction with an analysis unit.

It is the object of the invention that the determination of the map-referenced location of the observation device is carried out fully automatically in a short time (a few seconds), solely passively (no emission of electromagnetic radiation), with high precision, and at a defined point in time.

A further object of the invention is that in this case the location determination remains uninfluenced by interfering fields of electrical currents or vibrations, movements, and accelerations.

A further object of the invention is to enable a location determination which is not dependent on the visibility of predefined reference points and remains uninfluenced by unfavorable weather conditions, for example, overcast sky or reduced line of sight.

A further object of the invention is that the map-referenced location determination of the observation device can take place as independently as possible from the surroundings (even if it is populated hardly or not at all) and is also suitable for a terrestrial location determination (for example, UAV at low altitude).

These objects are achieved by the implementation of the characterizing features of the independent claim. Features which refine the invention in an alternative or advantageous manner can be inferred from the dependent patent claims.

The observation device according to the invention, which is designed in particular as field glasses, for example, as binoculars or a monocular, comprises a fully automatic map-referenced location determination functionality and has a camera (8) having an objective lens (2) and a camera sensor (3) for recording an image of terrain surrounding the camera as a camera image. Furthermore, the observation device according to the invention comprises a data memory for storing program data and a digital terrain model (DTM) (4), wherein the DTM contains at least parts of the surrounding terrain as spatial, digitally processable information. Said observation device additionally has a sensor system (5) for rough initial determination of a spatial location of the observation device, wherein the spatial location comprises an item of position information and/or an item of orientation information, an analysis unit (6) having data processing, image data processing, and sensor signal analysis functionality, and a display screen (7). In this case, the sensor signal analysis functionality of the analysis unit of the observation device according to the invention is configured for the purpose of carrying out a rough initial determination of the spatial location of the observation device by means of analysis of signals of the sensor system. The data processing functionality of the analysis unit is configured for the purpose of ascertaining, from the stored spatial information of the DTM, simulated image positions of terrain transitions potentially detectable by the camera (8), in relation to the initial roughly determined spatial location of the observation device. The image data processing functionality of the analysis unit is configured for the purpose of the recorded camera image being automatically checked for a presence of a depiction of a terrain transition at the ascertained simulated image positions, wherein the initial roughly determined spatial location of the observation device and accordingly the determined simulated image positions of potentially detectable terrain transitions are virtually varied within defined tolerances, in particular based on a previously ascertained result of the automatic checking. Furthermore, the analysis unit is configured for the purpose of repeating the automatic check in the scope of an optimization, in particular while varying the respective virtual spatial location and the simulated image positions, and to establish/determine the spatial location of the observation device as an optimization result based thereon.

In one possible alternative embodiment, at least one of the units data memory, analysis unit, or display screen can be located not at or on the observation device but rather detached therefrom and can be connected via a corresponding cable connection or wireless connection to one another and to the observation device for the purpose of data transmission. In this case, only a data communication interface is located at the observation device itself. This interface is then accordingly also located on the detached units and is used for transmitting and receiving corresponding data.

The location determination is performed in any case at a defined point in time at which an image of the surrounding terrain is recorded by the camera. As simultaneously as possible with the image recording, a rough initial determination of the spatial location of the observation device is then carried out by a sensor system, for example, by means of global positioning system (GPS) and digital magnetic compass (DMC) sensors. On the one hand, in this case the site position/coordinate information of the observation device is ascertained, for example, by means of a GPS sensor. On the other hand, a rough initial (potentially strongly error-prone) determination of the orientation of the observation device is carried out by one of the methods described at the outset, for example, by means of a DMC sensor.

A DTM, i.e., a digital topographic map, having three-dimensional representation of the terrain area of the surroundings of the site is provided in readable form on the data memory for the method. Using the spatial location of the observation device roughly initially determined by the sensor system and the camera calibration, both the depiction of transitions of terrain to the sky (horizon line or also only parts thereof) and also of transitions in the case of overlap of terrain structures having greatly differing distance (for example, hills in front of mountains) is computed therefrom and the corresponding simulated image positions of all terrain transitions are ascertained and stored.

The simulated image positions of terrain transitions previously ascertained for the specified spatial location of the observation device are used to check corresponding image positions of the recorded camera image for the presence of such transitions.

SUMMARY

In the scope of a numeric optimization, the spatial location of the observation device is virtually changed/varied so that an optimum correspondence is achieved between corresponding simulated terrain transitions and terrain transitions ascertained in the recorded camera image. The virtual change/variation of the spatial location of the observation device can correspond, for example, to an offset of the position and/or an angle adaptation of one, multiple, or all angles which define the orientation of the observation device (for example, Euler angles: azimuth, elevation angle, and roll angle). In this case, the dimension, for example, of the offset or the angle change is produced based on tolerance values. These defined tolerance values can be predefined, can be dynamically established and adapted during the checking, for example, based on a result of a preceding step of the check, or can be established/determined by a user.

The spatial location of the observation device thus found, which optimally reproduces all recognizable and ascertained terrain transitions of the DTM, represents the result of the optimization of the spatial location of the observation device.

In a further embodiment, the analysis unit also takes into consideration the distance of the respective terrain transition from the camera during the automatic check of the recorded camera image for the presence of a depiction of a terrain transition.

According to a further embodiment of the observation device, the respective determined simulated image positions are displayed overlaid on the recorded camera image on the display screen (7), in particular wherein a profile of the automatic check is visually represented.

In one advantageous embodiment, the observation device comprises input means, which enable a user, based on the simulated image positions displayed overlaid on the camera image on the display screen, to be able to terminate the automatic check by means of the input means, and/or repeat it. If necessary, further types of taking influence on the check, for example, pausing, step-by-step navigating forward and back between successive steps of the check, etc., can be made available by means of actuation of the input means.

In an alternative embodiment, the input means can also be located on a unit detached from the observation device, for example, on the data memory, on the analysis unit, or on the display screen.

In a further embodiment of the observation device, the user can change the automatic check by means of the input means by way of a manual adaptation of the defined tolerance values, to determine/establish the spatial location of the observation device again.

According to one advantageous embodiment, the rough initial determination of the spatial location of the observation device carried out by means of the analysis unit can be adapted by the user by means of the input means before the automatic check starts. For example, the adaptation of the initial roughly determined spatial location of the observation device is carried out based on the representation of the determined simulated image positions overlaid on the recorded camera image, whereby the initial roughly determined location is manually determined.

The image information of the recorded camera image necessary for the automatic check can be processed to form a classifier image, in which, for each pixel, a parameter of the probability that the pixel contains the depiction of a terrain transition is calculated. The simulated image positions of the terrain transitions previously computed for the specified spatial location of the observation device are then used to check corresponding image positions in the classifier image for the presence of such transitions.

In a further embodiment of the observation device, the analysis unit is therefore designed to prepare a classifier image from the recorded camera image, wherein image positions recorded in the classifier image are assigned parameters, in accordance with the probability of the presence of a depiction of a terrain transition at said recorded image position, and the corresponding parameters are visually represented as corresponding brightness values and the virtual variation of the spatial location of the observation device and accordingly the ascertained simulated image positions of potentially detectable terrain transitions is performed based on a correspondence check of the classifier image with the ascertained simulated image positions.

According to a further embodiment, the data memory comprises the DTM as digitally processable information in the form of items of point information, wherein said items of point information are provided as x, y, z coordinates, or items of point connection information or items of intensity information or items of color information or as any arbitrary combination thereof.

Furthermore, the digitally processable information can comprise point and/or area attributes. Examples of such representations of the terrain are triangular networks, polygonal networks, and non-uniform rational B-splines (NURBS). According to a further embodiment, the data memory comprises the DTM as digitally processable information in the form of height data stored in a grid data format.

In a further embodiment, the sensor system of the observation device comprises at least one global positioning system (GPS) sensor and/or at least one digital magnetic compass (DMC) for the initial rough determination of the spatial location of the observation device.

In one advantageous embodiment of the observation device, it has a housing protected from dust and/or impact and/or sprayed water.

In a further advantageous embodiment, the observation device additionally has a data transceiver for wirelessly receiving and transmitting DTM data, wherein received DTM data are stored by means of the analysis unit in the data memory and DTM data for transmission are retrieved by means of the analysis unit from the data memory and provided for transmission.

According to an alternative embodiment of the observation device, the ascertained simulated image positions are overlaid on a direct view through a telescope of the observation device and this direct view is used to check for the presence of a terrain transition at the computed image positions. In this case, for example, the variation/change of the spatial location of the observation device is not carried out virtually, but rather by a corresponding real movement and/or pivot of the observation device.

In a further alternative embodiment of the observation device, simulated depictions of terrain transitions, in particular based on an ascertained classifier image or the computed image positions, are overlaid on the direct view through a telescope of the observation device and this direct, overlaid view is used to check for the presence of a terrain transition at the computed image positions.

In a fully automatic method, based on the analysis of a camera image, in this manner a user can judge the result of the automatic location determination.

In a further advantageous embodiment of the observation device, it additionally comprises a fastening device and is fixedly connected via said fastening device to an object, in particular a helmet, a carrying strap, a tripod, a vehicle, or a flying object, wherein after a referencing of a spatial location of the object with a spatial location of the observation device, the spatial location of the object is established/determined based on the established/determined spatial location of the observation device.

BRIEF DESCRIPTION OF THE DRAWINGS

The observation device according to the invention having location determination functionality is described in greater detail solely by way of example hereafter on the basis of specific exemplary embodiments schematically illustrated in the drawings, wherein further advantages of the invention will also be discussed. In the specific figures.

It is obvious that these illustrated figures only schematically illustrate possible exemplary embodiments. The various approaches can also be combined with one another and with methods of the prior art.

The location determination functionality of the observation device improves a rough (potentially strongly error-prone) orientation determined using a conventional method described at the outset in all three Euler angles and position and supplies an item of high-accuracy spatial location information as a result.

Construction of the Device

Figure 1:
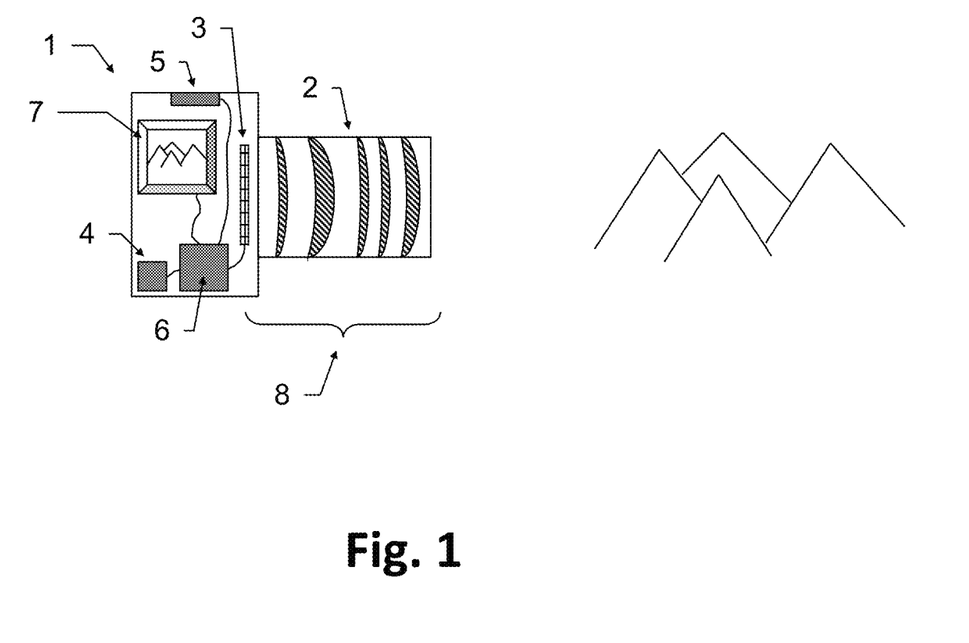
FIG. 1 shows by way of example the components which provide the location determination functionality of the observation device (1): a camera (8), consisting of an objective lens (2) and an image sensor (3); a data memory for storing program data and DTM (4); a sensor system (5); an analysis unit (6); and a display screen (7)

FIG. 1 shows a sketch of components (1), which provide the location determination functionality of the observation device: a (digital) camera (8), to depict a part of the surroundings/the terrain of the location. The camera has an image sensor (3), on which a depiction of a part of the surroundings/the terrain is produced via an objective lens (2), the image information of which is thus accessible in digitally processable form. The camera can also be embodied, for example, as a thermal imaging camera, to enable measurements at night and/or in complete darkness. The image sensor (3) used is to be as high-resolution as possible, to ensure a high measurement accuracy of the local roll angle (rotation of the camera around the camera main axis).

The objective lens (2) is advantageously embodied as a telephoto objective lens to achieve high measurement accuracies in the local azimuth (rotation around the image sensor column direction) and local elevation (rotation around the image sensor line direction).

The image recording is generally performed for short exposure times. As simultaneously as possible thereto, the site position is determined by a sensor system (5) and a rough initial determination of the orientation is carried out by means of one of the methods described at the outset.

The recording of the camera image and the sensor signals (site position and orientation) is performed very rapidly, with a typical time requirement of significantly less than one second, data processing, which can last several seconds, then follows. During the processing time, the system can be moved arbitrarily without influencing the measured value. This has advantages, for example, in applications for artillery observers, because the observer can immediately move back into protected cover after the recording of the camera image and the sensor signals of the sensor system.

As can easily be seen from this exemplary embodiment, the image detail of the camera image to be analyzed cannot be selected or changed multiple times in a cumbersome process by the user.

The location determination ideally functions with most of the possible orientations of the camera in relation to the terrain.

Figure 2:
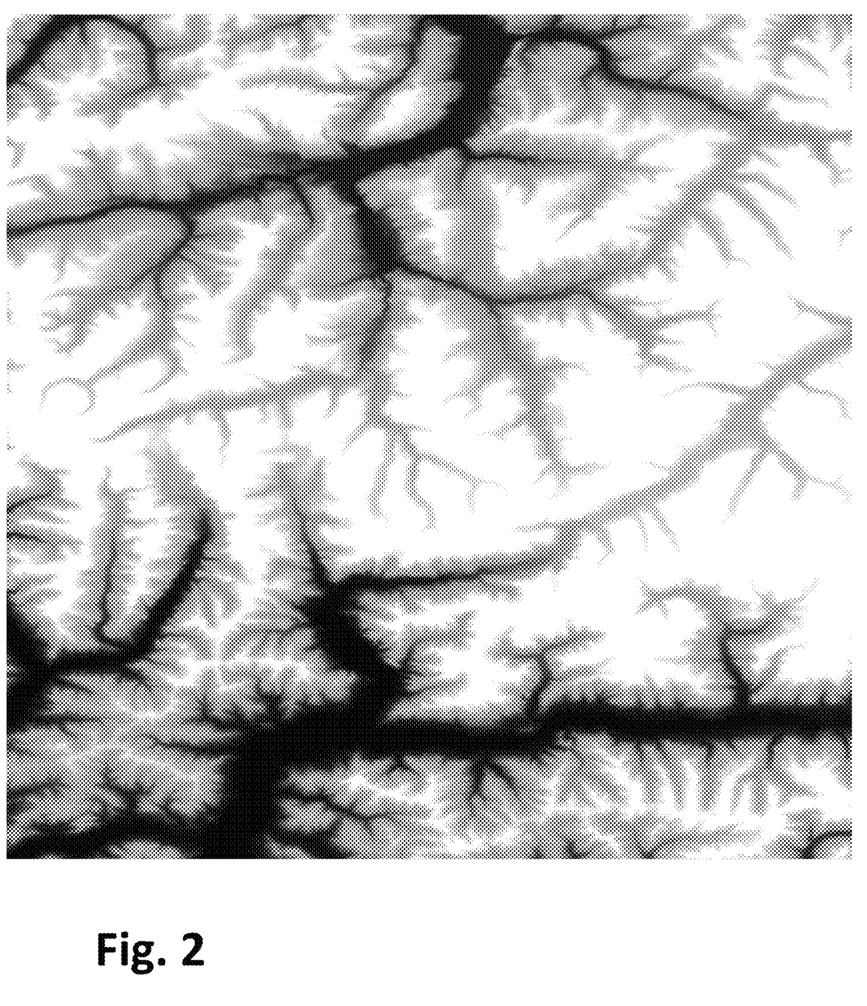
FIG. 2 shows a DTM, as an example here in the form of scanned height data.

In the scope of the processing, a DTM of the surroundings of the observation device/the camera is used. FIG. 2 shows such a DTM as an example in the format of scanned height data. The WGS84 terrain height shown as a grayscale image varies in this case from 200 m (black) to more than 1000 m (white). The DTM is a digital version of a topographic map, which contains the height profile of the terrain surface in the form of three-dimensional map information.

The term DTM is also used collectively here for other digital descriptions of the surfaces of the terrain, in particular also as a synonym of digital surface model DSM, which also contains height information of buildings and/or vegetation (for example, forest). Data formats which combine both types of information (often referred to as digital elevation model or DEM) are summarized here under the synonym DTM. Moreover, the possibility exists of representing the three-dimensional terrain structure as a triangulated irregular network (TIN) or with the aid of similar GIS formats. Such data structures are also denoted here collectively with the term DTM. In particular, there is also the option of additionally or exclusively using surface descriptions of artificial structures such as buildings, bridges, and roads instead of natural terrain structures. Such descriptions of the surrounding surfaces, which are typically stored as a GIS data format, can be used for the method and are also to be denoted here by the term DTM. Digital representations of surfaces always have a limited location resolution, i.e., the area between the specified data points has to/can be interpolated/extrapolated in a suitable manner. The embodiment of the DTM data as scanned heights is only by way of example in the further description.

Computation of the Simulated Panorama

Figure 3A:
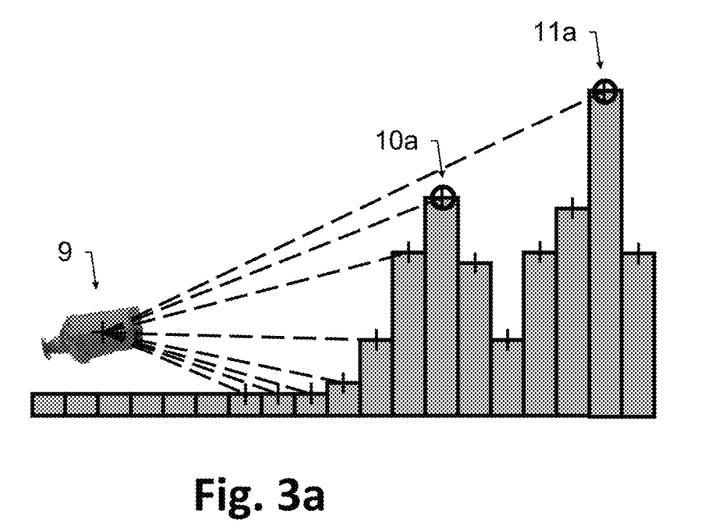
FIG. 3a shows a sketch of the computation of simulated image positions of terrain transitions.

FIG. 3a shows a DTM as an example in scanned height data as a view from the side. In this case, the earth's surface is divided into regular longitude intervals and latitude intervals (columns), which are depicted from the side here. Locally observed, for example, a division of one angle second in each case for longitude and latitude approximately corresponds to a division of the earth's surface into identical rectangles each having equal horizontal distances and equal vertical distances, i.e., a representation in the form of a grid. For every rectangle of the grid, the height information is stored referenced to a reference system (i.e., for example, WGS84 or EGM96 or EGM2008).

Figure 3B:
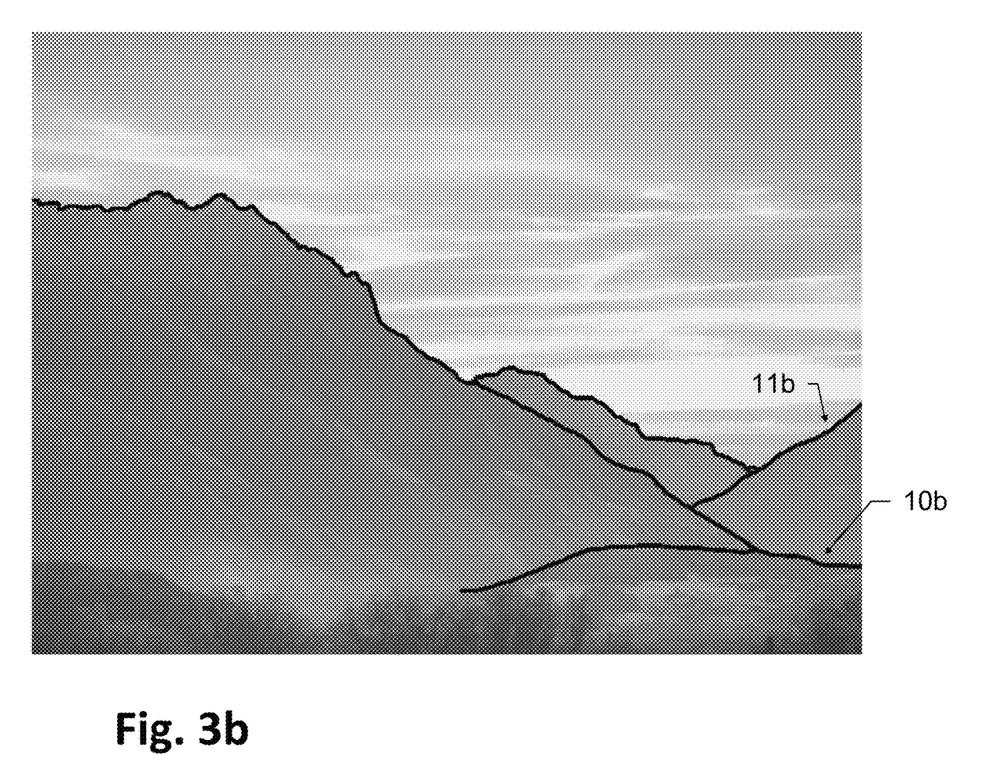
FIG. 3b shows an example of simulated image positions (black lines), which were overlaid on the camera image.

The simulated site position of the observation device within the DTM is identified by the field glasses (9). Steps on the DTM are simulated from there, at a specified azimuth, and in each case the DTM terrain height and the distance to the device are combined to form an item of angle information (elevation in the local coordinate system of the device). The maximum elevation (11a) is determined together with local maxima of the elevation (10a) along the studied azimuth direction. The maximum elevation corresponds to a simulated transition from imaged terrain to imaged sky, i.e., a horizon point. FIG. 3b shows the analyzed camera image and in (11b) a point of the horizon line. The local maxima (10a) of the elevation correspond in FIG. 3b to transitions (10b), where terrain in the foreground overlaps with terrain in the background (for example, hill in front of mountain).

A corresponding simulation is carried out for many of the azimuth directions of the camera field of view. The (many) points are shown black in FIG. 3b and overlaid on the camera image. This results in linear structures: the horizon line and the terrain-terrain transitions.

Figure 4:
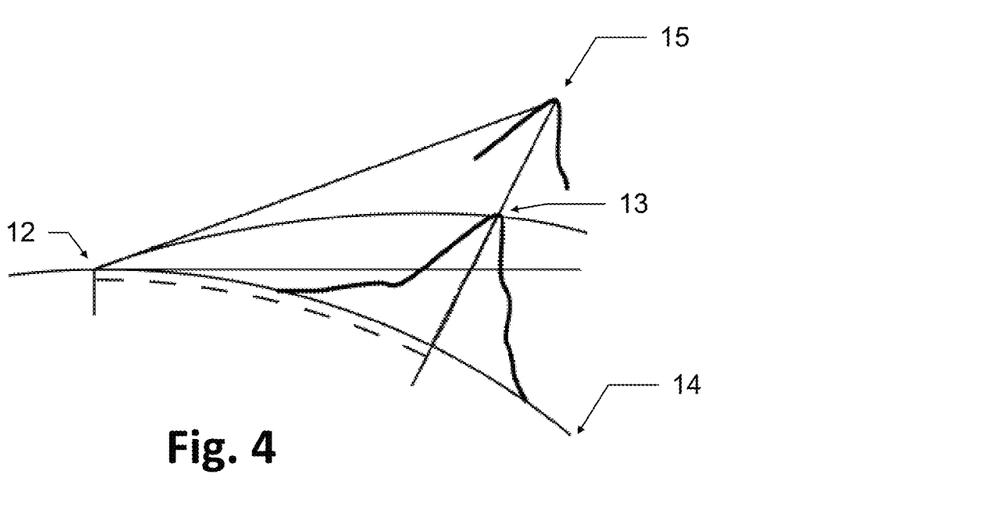
FIG. 4 shows a sketch of the computation of the influence of the earth's curvature and the atmospheric refraction on the computation of simulated image positions.

The computation was represented in simplified form here. As can be seen in FIG. 4, for greater distances, the apparent height of a terrain point (13) determined from one location (12) appears reduced due to the influence of the Earth's curvature (14). Moreover, atmospheric refraction results in a curvature of the imaging beams (from (12) to (13)), whereby the apparent height (15) is higher overall than the actually existing height (13). This is corrected accordingly during the ascertainment of the simulated image positions. For the atmospheric refraction, a meteorologically adapted model can be used. A simpler model, such as the refraction coefficient according to Gauss, is often sufficient.

If one uses the spatial location of the observation device roughly measured at the outset, from the directions previously computed from the DTM to terrain transitions potentially visible in the image (using a camera calibration), the depiction thereof in the camera image can be simulated i.e., an array of 2D image coordinates is obtained for imaging locations (simulated image positions) of potentially recognizable terrain transitions. For each of these image positions, the distance of the fundamental terrain transition from the camera from the previously performed simulation (elevation computation) is available for further analysis. For simulated transitions from overlap of terrain structures of different distances, the minimal distance of the two distances participating in the transition is used for this purpose.

Figure 5A:
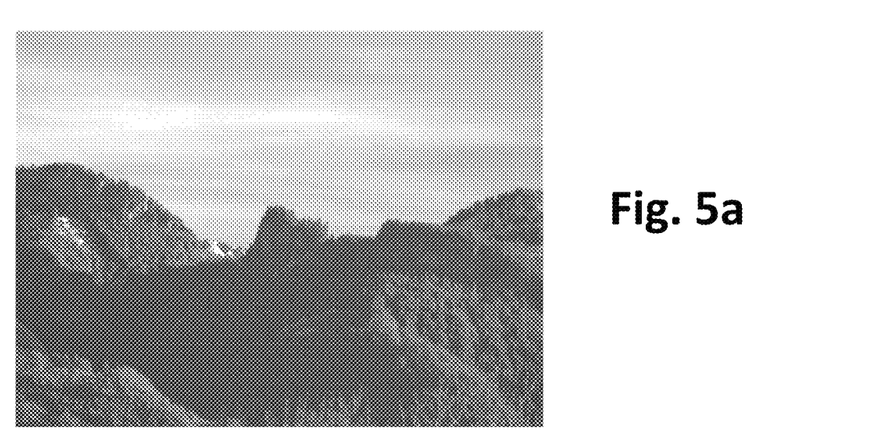
FIG. 5a shows by way of example the image recorded by the camera (camera image) for the analysis.
Figure 5B:
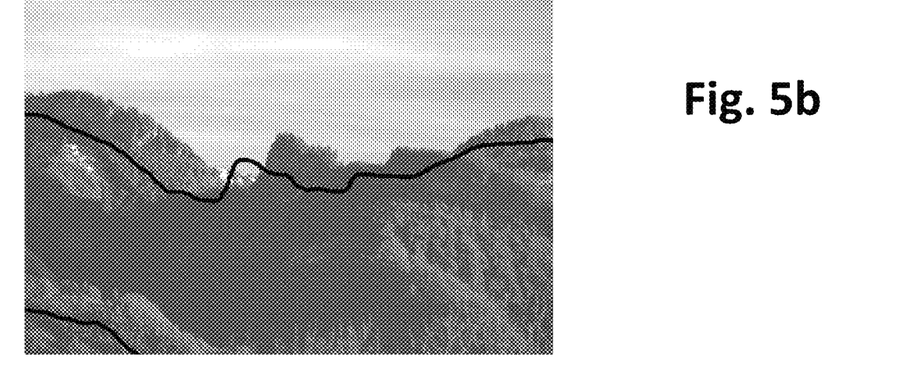
FIG. 5b shows the image positions of terrain transitions simulated based on the initial rough location measurement and the DTM.

FIG. 5a shows a recorded camera image. In FIG. 5b, the simulated image positions shown in black are overlaid on the camera image. The errors of the spatial location roughly determined at the outset by the sensor system result in obvious deviations of the simulated image positions from the actually depicted terrain transitions in the image.

Processing of the Camera Image to Form a Classifier Image

Figure 5C:
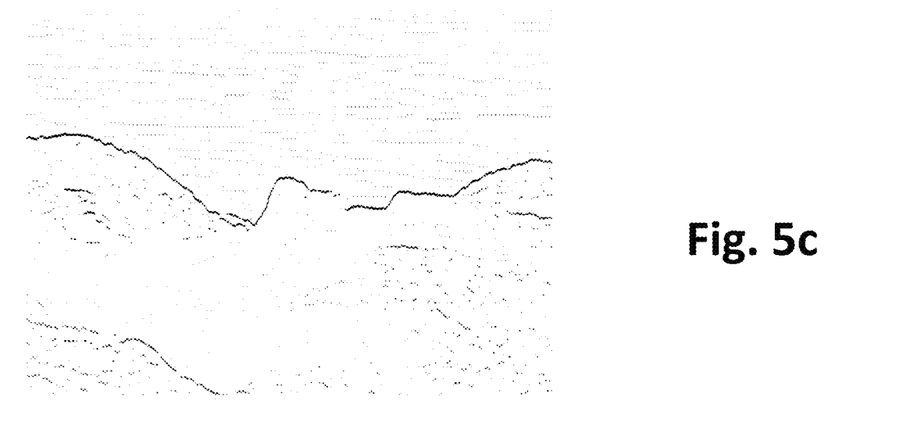
FIG. 5c shows a classifier image computed/ascertained from the camera image.

The recorded camera image is processed. The goal is to estimate on the basis of the image content for each pixel how probable it is a terrain transition is depicted thereon. FIG. 5c shows by way of example the result of this processing, the classifier image, in which the brightness values of the pixels were replaced by the probability value (high probabilities are shown dark here).

The computation of the classifier image can also take place in simplified form, for example, by the computation of a canny edge filter. The value of the pixel classification does not have to correspond exactly to the probability—it can be sufficient to use an estimation of a monotone value for the probability.

In the case of unfavorable lighting and/or weather conditions and/or terrain structures and/or terrain surface textures and/or objects external to DTM in the image, incorrect classifications occur for some pixels, as can also be seen in FIG. 5c.

Computation of the Target Function

For each of the computed, simulated image positions, it is checked within surroundings of the image position (search region) in the classifier image whether a terrain transition was found (classified) there. For the selection of the size of the search region, the distance to the camera previously computed for the image position is used. For shorter distances of the depicted terrain, a larger search region is used. Thus, for example, the displacement of a terrain transition in the image due to forest cover (for example, maximum considered height of the trees 20 m) can be compensated for by expanding the search from the image position computed from the DTM (forest floor) up to the height of the treetops.

The procedure can be improved if in addition to the DTM, for example, an item of information is provided about the local forest cover or its height. Moreover, the distance-dependent search region can be dispensed with if the forest cover/vegetation was already taken into consideration in the height information of the DTM.

For an analyzed simulated image position, the maximum value of the classification is determined within its search region, i.e., the best correspondence to the feature terrain transition.

The maximum classification values thus found are accumulated for all simulated image positions of terrain transitions (for example: all added) and a value is thus computed which is used as a target function of a numeric optimization of the camera orientation specified (previously for the simulation).

Algorithms of such numeric optimization tasks are prior art and are described, for example, in "Numerical Recipes in C. The Art of Scientific Computing", Second Edition. William H. Press et al., Cambridge University Press, 1992. One example is the Nelder-Mead downhill simplex method or also complete through-sampling (dense sampling) using an adapted density or combination of these and/or other methods.

Figure 5D:
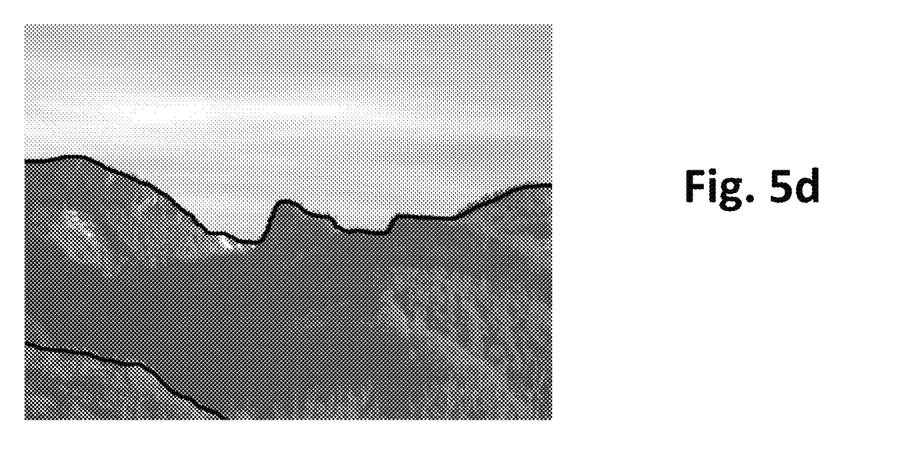
FIG. 5d shows the result of an optimization, which results in a more precise location determination proceeding from the image positions of terrain transitions simulated from the DTM.

The initial roughly determined spatial location of the observation device is virtually varied by the optimization algorithm in a suitable manner and the simulated image positions of terrain transitions of the DTM are determined again accordingly. The determination of the classifier image only has to be carried out once for the method (for one recorded camera image). For the newly computed/ascertained image positions, search regions are again sought out in the classifier image, the maximum value of the classification is determined in each case, and these maximum values are accumulated for all image positions. A new target function value thus results for the varied spatial location of the observation device. By repeating this procedure and comparing the target function values thus determined, the spatial location having the maximum target function is determined, at which the simulated image positions of the DTM terrain transitions match best with terrain transition positions in the classifier image. FIG. 5d shows the result of the optimization.

Advantages of the Method and Advantageous Variants

The adaptation is performed fully automatically—no interaction with the user is necessary. In particular, no assignment of landmarks/reference points to image positions has to be carried out by the user. All simulated image positions (which lie within the image boundaries) of all potentially recognizable terrain transitions (horizon line: transition terrain-sky and transitions of overlapping terrain structures of different distances) are always compared to the classifier image—no restriction to individual points (landmarks) is used, and previously known reference points are also not used. The location determination is thus also possible with very simply structured terrain profiles in the image content.

In addition, the location determination functionality is robust with respect to a large proportion of incorrect classifications in the classifier image, because, on the one hand, the correct image positions at correct spatial location are assisted by the comparison to the simulated image positions of the terrain transitions of the DTM and, on the other hand, most incorrect classifications do not participate in the comparison. This is a substantial advantage in comparison to methods which, without using the information about the terrain structure, exclusively attempt to extract terrain structures from the image, for example, as disclosed in "Camera geolocation from mountain images". Yi Chen et al., Proceedings of the 18th International Conference on Information Fusion, IEEE, 2013.

Incorrect classifications in the classifier image occur, for example, if terrain-external objects are depicted. Such objects, which are not contained in the DTM information (for example, trees, vehicles), can generate contrasts in the image which are incorrectly classified as terrain transitions (classification false positive). Moreover, terrain-external objects can conceal parts of the terrain at close range and prevent the depiction of terrain transitions (classification false negative).

Figure 6:
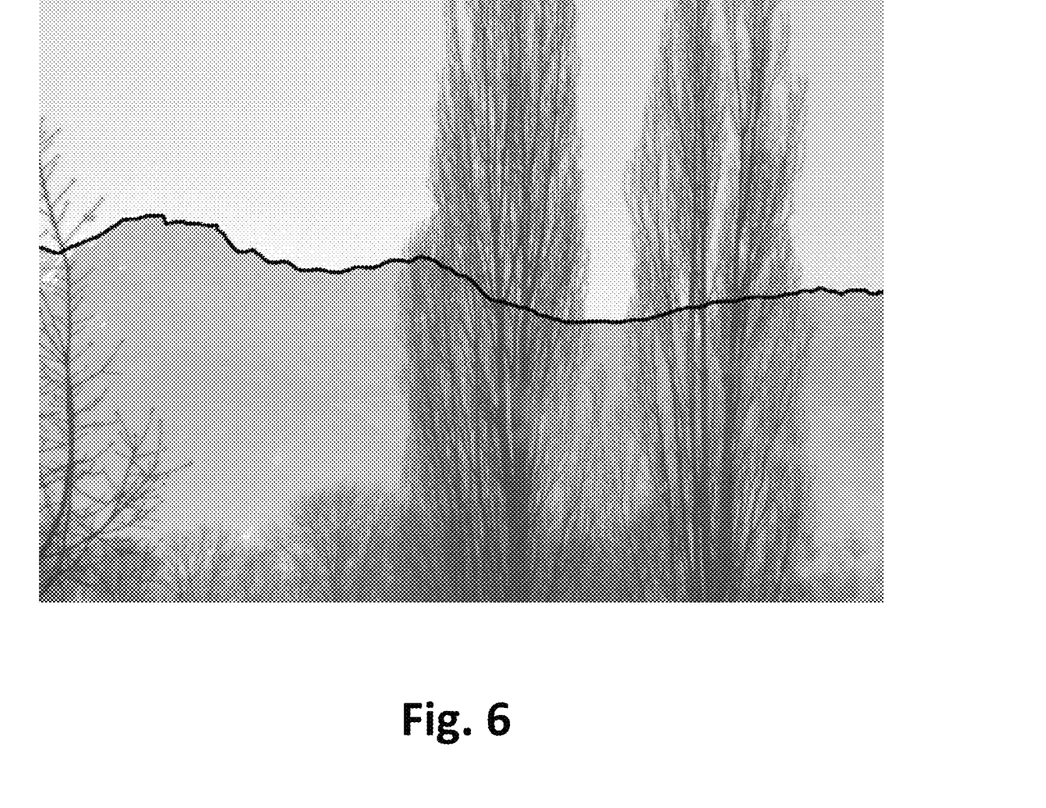
FIG. 6 shows an example of terrain-external structures (trees) depicted in the camera image and the nonetheless correct result of the optimization.

FIG. 6 shows such an example. The depicted tree (terrain-external object) in the foreground conceals parts of the horizon line and moreover results in image contrasts which could incorrectly be classified as a terrain transition. Nonetheless, the location determination described here results in the correct solution fully automatically (black line in FIG. 6), because the direct comparison of the classifier image to the simulated depictions of terrain transitions filters out a majority of the incorrect classifications. Moreover, in this comparison, the distance of the terrain transitions from the observation device and/or the camera (known from the simulation of the depiction) is used, to correct for a possible interference with the image analysis due to forest cover. The location determination can also be executed so that preferably more remote terrain transitions are analyzed, because the interference of the image analysis due to forest cover and the interference of the processing due to errors in the site position are thus reduced.

Figure 7:
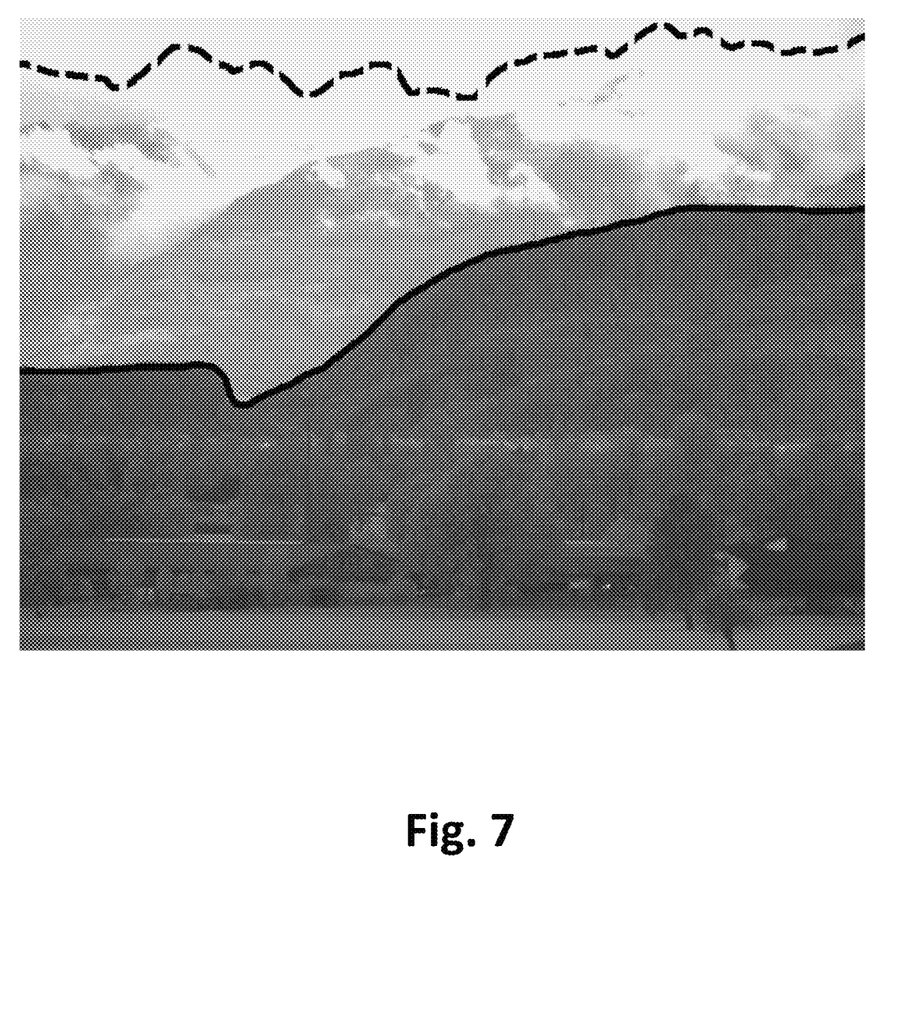
FIG. 7 shows the result of a location determination proceeding from a camera image having weather-related reduced line of sight.

Another example of terrain-external structures are clouds, which can generate high-contrast structures in the image and can be confused with the horizon line by other methods of image analysis. FIG. 7 is a camera image of such a situation. The clouds in the background of the image moreover conceal the horizon line (simulated image positions marked by dashed lines), but not the terrain-terrain transition in the image foreground. In that all potentially visible terrain transitions are always compared in the scope of the location determination, the comparison concentrates automatically on closer terrain structures in the event of poor vision conditions.

With unfavorable combination of terrain structure and elevation angle, it can also be that, for example, the horizon line is not depicted, but rather only overlapping terrain structures of different distances. In the scope of the location determination presented here, only points are analyzed at which a terrain-sky transition or a terrain-terrain transition has been predicted by the DTM. In particular, laterally consistent area textures or consistent area colors are ignored by design of the classifier (pixel value of the classifier image). The location determination is thus robust with respect to variably appearing terrain areas as a result of snowfall or differing lighting.

If the terrain structure is excessively simple (for example, fully planar), it is automatically decided on the basis of the simulated image positions whether instead of the complete location determination, only the elevation angle and roll angle are optimized and thus improved.

Moreover, in the event of not enough recognizable structures in the camera image (for example, in the event of insufficient line of sight or fog), it is automatically decided to terminate the location determination without result, with error message.

The location determination can only be executed if the terrain and the terrain model correspond well, i.e., in the case of terrain variable in the medium term (for example, dunes in the Sahara), a matching, sufficiently up-to-date DTM has to be used.

The location determination is used to improve the orientation and position (for example, GPS improvement). For this purpose, the position and the orientation are varied and improved by the above-described numerical optimization.

After successful location determination, the simulated image of the terrain transitions can be overlaid as an overlay on the recorded camera image (cf.: FIG. 5b and FIG. 5d). This enables the user to judge the result. An inadequate/ incorrectly adapted spatial location can also be corrected again manually in the comparison overlay/image.

Alternatively thereto, the described overlay can also be overlaid on the recorded camera image of a second camera (auxiliary camera). This can be advisable if the auxiliary camera depicts other parts of the electromagnetic spectrum (for example, thermal imaging camera or night vision device), which takes into consideration the visual analysis by the user better than the camera (8) used for the location determination. To ensure a comparability of the overlay with the camera image of the auxiliary camera, it is advantageous if the camera centers of auxiliary camera and camera are not excessively far away from one another and moreover the orientations of the main axes and the field of view angles of both cameras only deviate from one another by a small amount, so that a computer adaptation remains possible.

In a further variant, a telescope of the observation device having direct view of the surroundings can be embodied so that displays of a display screen can be perceived overlaid on the telescope image. Using this display screen, the simulated image of the terrain transition can be overlaid as an overlay on the telescope image (direct view). The use of direct view (instead of a camera image) has the advantage of its often higher resolution and better color representation.

The determined spatial location of the observation device can either be used directly (if a target object was targeted) or as an initialization or re-initialization of another location determination method. In particular, the cooperation with an INS system or a DMC measurement (measurement: magnetic declination) or as a starting value for a video tracking system can thus offer advantages. All three outlined options permit the determination of a spatial location in relation to a general target object, without consideration of the respective location determination method.

In some cases, the initial rough determination of the spatial location (for example, DMC) at the beginning can be entirely omitted. For this purpose, the numeric optimization is simply expanded to all possible positions and orientations and an optimization method is selected which avoids errors due to local optima.

If such a consideration of all possible positions and orientations cannot be executed (processing time, stability in relation to local optima, multiple terrain structure profiles similar to one another), the improvement of elevation and roll angle in surroundings of the measured values and the improvement of the azimuth in the entire value range can thus also be performed proceeding from a rough inclination measurement (initial values for elevation and roll angle).

Finally, the method can also operate entirely without the rough determination of the initial spatial location by a specification of the initial spatial location being performed by the user. This can be carried out directly, or also by step-by-step manual adaptation of the orientation or position and comparison of simulated overlay and surroundings image.

If the camera of the system is embodied as a thermal imaging camera, the method can also be applied at night and/or in absolute darkness. Embodiments of the camera as a lowlight camera and/or digital residual light amplifier and/or camera in the SWIR range offer other options for analyses during the night.

What is claimed is:

1. An observation device, including field glasses designed as binoculars or a monocular, having a fully automatic map-referenced location determination functionality, comprising:
    a camera having an objective lens and a camera sensor for recording an image of a terrain surrounding the camera as a camera image;
    a data memory for storing program data and a digital terrain model (DTM), wherein the DTM contains at least parts of the surrounding terrain as spatial, digitally processable information;
    a sensor system for a rough initial determination of a spatial location of the observation device, wherein the spatial location comprises an item of position information or an item of orientation information;
    an analysis unit having data processing functionality, image data processing functionality, and sensor signal analysis functionality; and
    a display screen, wherein the analysis unit is configured for the purpose of:
        carrying out the rough initial determination of the spatial location of the observation device by means of analysis of signals of the sensor system; and
        ascertaining, from the stored spatial information of the DTM, simulated image positions of terrain transitions potentially detectable by the camera, in relation to the initial roughly determined spatial location of the observation device; and
        at the ascertained simulated image positions, the recorded camera image is automatically checked for a presence of a depiction of a terrain transition, wherein the initial roughly determined spatial location of the observation device and accordingly the ascertained simulated image positions of potentially detectable terrain transitions are virtually varied within defined tolerances based on a previously ascertained result of the automatic check for the presence of a depiction of a terrain transition; and the automatic check for the presence of a depiction of a terrain transition is repeated in the scope of an optimization, with variation of the respective virtual spatial location and the simulated image positions, and the spatial location of the observation device is determined as an optimization result based thereon.

2. The observation device according to claim 1, wherein in the automatic check of the recorded camera image for the presence of a depiction of a terrain transition, the analysis unit also takes into consideration the distance of the respective terrain transition from the camera.

3. The observation device according to claim 1, wherein the respective ascertained simulated image positions are displayed on the display screen overlaid on the camera image, in particular wherein a profile of the automatic check is visually represented.

4. The observation device according to claim 3, wherein the observation device comprises input means and a user can terminate the automatic check by means of the input means, or repeat it, based on the simulated image positions displayed on the display screen and overlaid on the camera image.

5. The observation device according to claim 4, wherein the user can change the automatic check by means of the input means by way of a manual adaptation of the defined tolerance values, to determine/establish the spatial location of the observation device again.

6. The observation device according to claim 4, wherein the rough initial determination of the spatial location of the observation device carried out by means of the analysis unit can be adapted before the automatic check by the user by means of the input means, in particular in such a way that the initial roughly determined location is manually determined based on the ascertained simulated image positions overlaid on the camera image.

7. The observation device according to claim 1, wherein the analysis unit is designed for the purpose of preparing a classifier image from the recorded camera image, wherein parameters, corresponding to the probability of the presence of a depiction of a terrain transition at said recorded image position, are assigned to recorded image positions in the classifier image, and the corresponding parameters are represented visually as corresponding brightness values and the virtual variation of the spatial location of the observation device and accordingly of the ascertained simulated image positions of potentially detectable terrain transitions is carried out based on a correspondence check of the classifier image with the ascertained simulated image positions.

8. The observation device according to claim 1, wherein the data memory contains the DTM as digitally processable information in the form of items of point information, which contain at least one of the following items of information:
x, y, z coordinates;
items of point connection information;
items of intensity information; or
items of color information.

9. The observation device according to claim 1, wherein the data memory contains the DTM as digitally processable information in the form of items of point information, which contain at least one of the following items of information:
x, y, z coordinates;
items of point connection information;
items of intensity information; and
items of color information.

10. The observation device according to claim 1, wherein the data memory comprises the DTM as digitally processable information in the form of height data stored in a scanning data format.

11. The observation device according to claim 1, wherein the sensor system comprises at least one global positioning system (GPS) sensor or at least one digital magnetic compass (DMC) for the initial rough determination of the spatial location of the observation device.

12. The observation device according to claim 1, further comprising a housing protected from dust or impact or sprayed water.

13. The observation device according to claim 1, further comprising a data transceiver for wirelessly receiving and transmitting DTM data, wherein received DTM data are stored by means of the analysis unit in the data memory and DTM data for transmission are retrieved by means of the analysis unit from the data memory and provided for transmission.

14. The observation device according to any claim 1, wherein the determined simulated image positions are overlaid on a direct view through a telescope of the observation device and this direct, overlaid view is used to check for the presence of a terrain transition at the computed image positions.

15. The observation device according to claim 1, wherein simulated depictions of terrain transitions, in particular based on an ascertained classifier image or the computed image positions, are overlaid on the direct view through a telescope of the observation device and this direct, overlaid view is used to check for the presence of a terrain transition at the computed image positions.

16. The observation device according to claim 1, wherein the observation device further comprises a fastening device and is fixedly connected via said fastening device to an object.

17. The observation device according to claim 16, wherein the object includes a helmet, a carrying belt, a tripod, a vehicle, or a flying object.

18. The observation device according to claim 16, wherein after a referencing of a spatial location of the object with a spatial location of the observation device, the spatial location of the object is established/determined based on the established/determined spatial location of the observation device.

19. An observation device, including field glasses designed as binoculars or a monocular, having a fully automatic map-referenced location determination functionality, comprising:

a camera having an objective lens and a camera sensor for recording an image of a terrain surrounding the camera as a camera image;

a data memory for storing program data and a digital terrain model (DTM), wherein the DTM contains at least parts of the surrounding terrain as spatial, digitally processable information;

a sensor system for a rough initial determination of a spatial location of the observation device, wherein the spatial location comprises an item of position information and an item of orientation information;

an analysis unit having data processing functionality, image data processing functionality, and sensor signal analysis functionality; and a display screen, wherein the analysis unit is configured for the purpose of:
  carrying out the rough initial determination of the spatial location of the observation device by means of analysis of signals of the sensor system; and
  ascertaining, from the stored spatial information of the DTM, simulated image positions of terrain transitions potentially detectable by the camera, in relation to the initial roughly determined spatial location of the observation device; and
  at the ascertained simulated image positions, the recorded camera image is automatically checked for a presence of a depiction of a terrain transition, wherein the initial roughly determined spatial location of the observation device and accordingly the ascertained simulated image positions of potentially detectable terrain transitions are virtually varied within defined tolerances based on a previously ascertained result of the automatic check for the presence of a depiction of a terrain transition; and
  the automatic check for the presence of a depiction of a terrain transition is repeated in the scope of an optimization, with variation of the respective virtual spatial location and the simulated image positions, and the spatial location of the observation device is determined as an optimization result based thereon.

20. An observation device, including field glasses designed as binoculars or a monocular, having a fully automatic map-referenced location determination functionality, comprising:
  a camera having an objective lens and a camera sensor for recording an image of a terrain surrounding the camera as a camera image;
  a data memory for storing program data and a digital terrain model (DTM), wherein the DTM contains at least parts of the surrounding terrain as spatial, digitally processable information;
  a sensor system for a rough initial determination of a spatial location of the observation device, wherein the spatial location comprises an item of position information or an item of orientation information;
  an analysis unit having data processing functionality, image data processing functionality, and sensor signal analysis functionality; and
  a display screen, wherein the analysis unit is configured for the purpose of:
    carrying out the rough initial determination of the spatial location of the observation device by means of analysis of signals of the sensor system; and
    ascertaining, from the stored spatial information of the DTM, simulated image positions of terrain transitions potentially detectable by the camera, in relation to the initial roughly determined spatial location of the observation device; and
    at the ascertained simulated image positions, the recorded camera image is automatically checked for a presence of a depiction of a terrain transition, wherein the initial roughly determined spatial location of the observation device and accordingly the ascertained simulated image positions of potentially detectable terrain transitions are virtually varied within defined tolerances based on a previously ascertained result of the automatic check for the presence of a depiction of a terrain transition; and
    the automatic check for the presence of a depiction of a terrain transition is repeated in the scope of an optimization, with variation of the respective virtual spatial location and the simulated image positions, and the spatial location of the observation device is established as an optimization result based thereon.

* * * * *